UNITED STATES PATENT OFFICE.

ARNOLD ERLENBACH, OF ESSEN-ON-THE-RUHR, GERMANY.

METHOD OF UTILIZING TIN OF STANNIFEROUS MATERIALS.

SPECIFICATION forming part of Letters Patent No. 549,596, dated November 12, 1895.

Application filed January 18, 1895. Serial No. 535,393. (No specimens.)

*To all whom it may concern:*

Be it known that I, ARNOLD ERLENBACH, a subject of the King of Bavaria, and a resident of Essen-on-the-Ruhr, in the Province of the Rhine, German Empire, have invented a new and useful Method of Utilizing the Tin of Stanniferous Materials by Turning it into Perchloride of Tin, of which the following is an exact specification.

This invention refers to a method of utilizing the tin of stanniferous materials—as, for instance, waste pieces of tinned sheet-iron, tin-putty or putty-powder, stanniferous waste of dyeing and finishing factories, and the like. The purpose of my invention is to gain said tin in a pure state with the least loss possible and in a way more simple than those employed up to now. I attain that purpose, briefly stated beforehand, by turning the tin into perchloride of tin, (instead of into metallic tin, as done hitherto,) the chloride being a highly-valuable substance.

If stannous chloride lyes, as they result from the ordinary process of freeing tinned sheet-iron from its tin, or muriatic solutions of tin-putty or putty-powder, respectively, are to be treated, they are turned into stannic-chloride solutions by means of oxidation. This, for instance, may be performed by heating the lye together with a mixture of muriatic acid and nitric acid, according to the following formula:

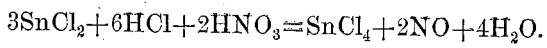
$$3SnCl_2 + 6HCl + 2HNO_3 = SnCl_4 + 2NO + 4H_2O.$$

As to dyeing-factories, the waste of the same is also turned into stannic-chloride solutions, provided said waste does not originally consist of such latter ones. If the said waste consists of hydrated stannic oxide, (as is greatly the case of late in silk-dyeing factories,) said hydrated stannic oxide is dissolved within an equivalent quantity of muriatic acid, so that a solution of stannic chloride is produced thereby. Said solutions of stannic chloride are concentrated as strongly as possible. If, after the required concentricity has been reached, the heating of the concentrated solution is continued, there takes place a quick dissociation of said stannic chloride, the latter being decomposed into muriatic acid (which distills off and carries with it a small part of the stannic chloride) and non-distillable basic stannic chloride. In order to prevent the formation of said basic stannic chloride or to turn the latter (if already formed) into stannic chloride, respectively, the distillation is effected within a stream of muriatic acid. There, then, the greatest part of the chloride of tin distills over while a small part remains, the quantity of the latter being corresponding to that of the impurities contained within the solution. The tin contained within said residue may be regained as a hydroxide by treating the said residue with water, the latter being, perhaps, furnished with an addition of sodium sulphate, sulphuric acid, or the like.

The hydroxide regained is dissolved within muriatic acid, concentrated by evaporation, and reintroduced into the circuit of the process. The concentration may be performed at ordinary pressure as well as within a vacuum.

Having thus fully described the nature of this invention, what I desire to secure by Letters Patent of the United States is—

The method of gaining tin from stanniferous materials, consisting in heating the latter together with muriatic acid so as to turn the tin of said materials into solutions of perchloride of tin, concentrating said solutions, continuing the heating so as to cause the perchloride of tin to distill off, and simultaneously therewith introducing a stream of muriatic acid into said perchloride of tin, and distilling off so as to obtain an aqueous perchloride of tin, substantially as described.

In testimony whereof I have signed this specification in the presence of two subscribing witnesses.

ARNOLD ERLENBACH.

Witnesses:
KARL GOLDSCHMIDT,
ALBERT KLINGHAMMER.